(12) United States Patent (10) Patent No.: US 11,114,754 B2
Stumper et al. (45) Date of Patent: Sep. 7, 2021

(54) RADAR ANTENNA DEVICE AND METHOD FOR SHIELDING A RADAR ANTENNA DEVICE

(71) Applicant: TMT TAPPING-MEASURING-TECHNOLOGY GMBH, Siegen (DE)

(72) Inventors: Jean-Francois Stumper, Filsdorf (LU); Kevin Viktor, Bürden (LU)

(73) Assignee: TMT TAPPING-MEASURING-TECHNOLOGY GMBH, Siegen (DE)

( * ) Notice: Subject to any disclaimer, the term of this patent is extended or adjusted under 35 U.S.C. 154(b) by 314 days.

(21) Appl. No.: 16/090,864

(22) PCT Filed: Apr. 7, 2016

(86) PCT No.: PCT/EP2016/057579
§ 371 (c)(1),
(2) Date: Oct. 3, 2018

(87) PCT Pub. No.: WO2017/174135
PCT Pub. Date: Oct. 12, 2017

(65) Prior Publication Data
US 2020/0328508 A1 Oct. 15, 2020

(51) Int. Cl.
*H01Q 1/42* (2006.01)
*G01F 22/02* (2006.01)
(Continued)

(52) U.S. Cl.
CPC ............... *H01Q 1/42* (2013.01); *G01F 22/02* (2013.01); *H01Q 1/002* (2013.01); *H01Q 1/22* (2013.01)

(58) Field of Classification Search
CPC . H01Q 1/42; H01Q 1/22; H01Q 1/002; G01F 22/02
See application file for complete search history.

(56) References Cited

U.S. PATENT DOCUMENTS

| | | | | |
|---|---|---|---|---|
| 4,110,617 A | * | 8/1978 | Legille | G01C 7/00 250/342 |
| 5,043,735 A | * | 8/1991 | Mawhinney | C21B 7/24 342/124 |

(Continued)

FOREIGN PATENT DOCUMENTS

| | | |
|---|---|---|
| GB | 2039365 A | 8/1980 |
| JP | 59207701 | 11/1984 |

(Continued)

OTHER PUBLICATIONS

English Abstract for JP2015172184A dated Oct. 1, 2015.

*Primary Examiner* — Awat M Salih
(74) *Attorney, Agent, or Firm* — Dickinson Wright PLLC; Andrew D. Dorisio

(57) ABSTRACT

A radar antenna device (16) having an antenna arrangement (19) that is accommodated in a housing (17) and is provided with a protective plate (20) for being separated with respect to a furnace atmosphere formed within a furnace chamber, said protective plate (20) being disposed on the housing, a radar-transparent limp material layer (21) comprising pores being disposed as a shield at a distance upstream of the protective plate (20) in such a manner that a space which is separated by the material layer (21) with respect to the furnace chamber is formed, a fluid line opening into said space for applying a fluid flow to the material layer (21).

12 Claims, 3 Drawing Sheets

(51) Int. Cl.
*H01Q 1/00* (2006.01)
*H01Q 1/22* (2006.01)

(56) References Cited

U.S. PATENT DOCUMENTS

| | | | |
|---|---|---|---|
| 8,022,333 B2* | 9/2011 | Maeuser | B32B 17/10761 |
| | | | 219/203 |
| 9,306,290 B1* | 4/2016 | Grop | H01Q 17/008 |
| 10,454,161 B1* | 10/2019 | Puzella | H01Q 1/422 |
| 10,877,144 B2* | 12/2020 | Morgenstern | G01S 5/0205 |
| 2011/0193274 A1 | 8/2011 | Lu et al. | |
| 2014/0017156 A1* | 1/2014 | Nagata | F27B 3/08 |
| | | | 423/349 |
| 2014/0047917 A1 | 2/2014 | Vogt et al. | |

FOREIGN PATENT DOCUMENTS

| | | |
|---|---|---|
| JP | 201121910 | 10/2009 |
| JP | 2009233481 A | 10/2009 |
| JP | 2014215166 A | 11/2014 |
| JP | 2015172184 A | 10/2015 |
| KR | 20060054336 A | 5/2006 |
| WO | WO2010144936 A1 | 12/2010 |
| WO | WO2015107195 A1 | 7/2015 |

* cited by examiner

Fig. 3
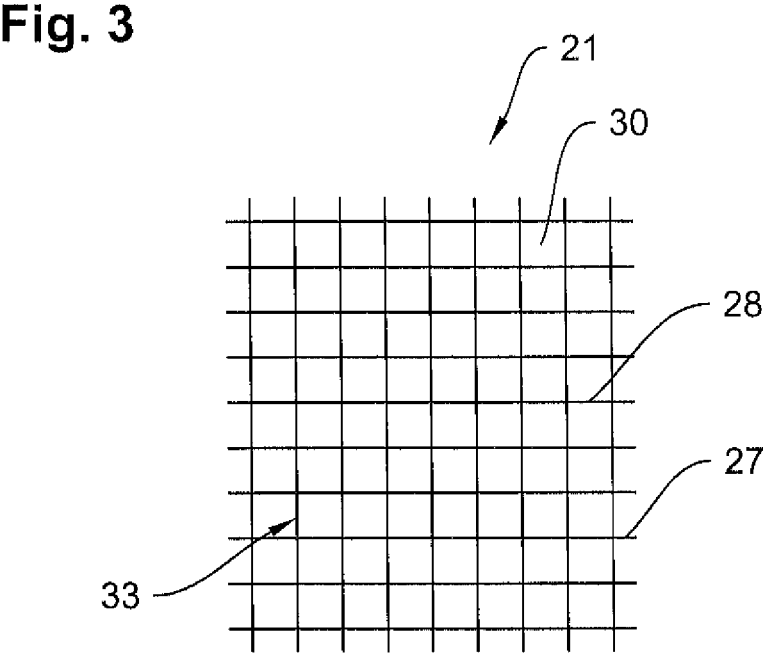
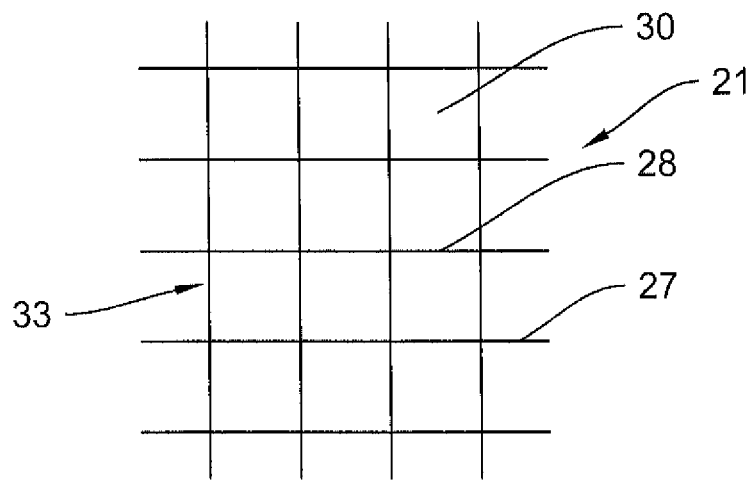
Fig. 4

RADAR ANTENNA DEVICE AND METHOD FOR SHIELDING A RADAR ANTENNA DEVICE

FIELD OF THE INVENTION

The present invention relates to a radar antenna device having an antenna arrangement that is accommodated in a housing and is provided with a radar-transparent protective plate for being separated with respect to a furnace atmosphere formed within a furnace chamber, said protective plate being disposed on the housing. Furthermore the invention relates to a method for shielding a radar antenna device which emits radar radiation and comprises an antenna arrangement disposed in a housing, said antenna arrangement being provided with a protective plate for being separated with respect to a furnace atmosphere formed within a furnace chamber and said protective plate being disposed on the housing.

BACKGROUND OF THE INVENTION

Radar antenna devices of the aforementioned type are arranged in a furnace chamber and are used for determining the topography of the burden surface in a shaft furnace. For this purpose, a radar radiation emitted by the antenna of an antenna arrangement is applied to the burden surface. A radar-transparent protective plate which separates the antenna arrangement with respect to the furnace atmosphere is provided for protecting the antenna arrangement with respect to the furnace atmosphere so that dust, in particular the dust contained within the oven atmosphere, does not get onto the antenna arrangement. With regard to the moisture contained within the furnace atmosphere a deposit is formed on the plate surface which reduces the radar transparency of the protective plate necessary for normal operation of the radar antenna device so that cleaning the protective plate is necessary on a regular basis to be able to reliably determine the topography of the burden surface.

From WO 2010/144936 A1 a radar antenna device is known which is provided with a rinsing nozzle for cleaning a protective plate disposed upstream of the antenna arrangement, said rinsing nozzle being directed towards the surface of the protective plate and a rinsing fluid being continually sprayed on the plate surface by means of said rinsing nozzle. While cleaning the plate surface is repeatedly possible by rinsing the protective plate as known from WO 2010/144936 A1, it can be determined that over the course of a longer operation of the radar antenna device the protective plate will become turbid despite continually rinsing the plate surface so that the protective plate ultimately needs to be replaced.

SUMMARY OF THE INVENTION

The object of the present invention is to propose a radar antenna device or a method for shielding a radar antenna device which allows a longer service life of the protective plate which separates the antenna arrangement with respect to the furnace atmosphere.

To attain this object, the radar antenna device according to the invention has the features of claim 1.

According to the invention, a radar-transparent limp material layer comprising pores is disposed as a shield at a distance upstream of the protective plate in such a manner that a space which is separated by the material layer with respect to the furnace chamber is formed, a fluid line opening into said space for applying a fluid flow to the material layer.

The radar antenna device according to the invention prevents the dust contained within the furnace atmosphere from directly being applied to the protective plate due to the material layer which is disposed as a shield upstream of the protective plate. Instead, the dust from the furnace atmosphere settles on the surface of the material layer. A pressurized fluid, in particular nitrogen, can be applied to the space, which is disposed between the material layer and the protective plate, via the fluid line which opens into the space in such a manner that the nitrogen escapes into the furnace chamber through the pores of the material layer and thus causes the material layer to vibrate by means of the flow resistance formed by the material layer. Dust which has settled on the material layer is shaken off or blown off of the material layer by means of the vibrations caused by the material layer and by means of the current flowing through the pores formed within the material layer.

In contrast to the known device, in which a rinsing fluid is directly applied to the protective plate, the radar antenna device according to the invention allows, on the one hand, no dust to settle on the protective plate at all or optionally only to a substantially lesser degree owing to the material layer being disposed upstream and, on the other hand, dust disposed instead on the material layer to be removed from said material layer. At any rate, the thereby at least starkly decreased level of dust on the protective plate allows an overall longer service life of the protective plate.

The material layer is preferably formed in an elastic manner so that thereby the creation of vibrations of the material layer is supported. An elastic embodiment of the material layer is, however, not a requirement for generating vibrations of the material layer. Creation of vibrations can even be promoted by arranging the limp material layer on the housing without applying pretension, so in particular with slack so that the material layer can flutter as a result of pressure being applied by means of the fluid flow.

It is particularly advantageous if the material layer comprises a fabric structure, e.g. realized as a cloth, so that it is possible to form a defined consistent pore diameter within the material layer by means of the fabric design.

If the fabric further comprises at least partially elastic longitudinal threads or transverse threads, the desired elasticity of the fabric structure can also be adjusted in a defined manner.

For this purpose, the longitudinal threads or transverse threads can be provided with an elastic sheath, in particular made from a material or having a material thickness, which allows the desired elastic properties.

Alternatively, it is possible for the longitudinal threads or transverse threads to be impregnated with an elastic material.

It is also advantageous if the fluid line is at least partially formed within a housing wall of the housing so that conducting the fluid flow into the space is possible without any additional installations.

If the fluid line is provided with a heating device at least in sections, it is possible to prevent the moisture contained within the furnace atmosphere from condensing on the material layer, therefore preventing a possible moist dust layer from forming on the material layer.

The method according to the invention has the features of claim 9.

According to the invention, a radar-transparent limp material layer comprising pores is disposed upstream of the protective plate as a shield in such a manner that a space is formed between the protective plate and the material layer, said space being separated with respect to the furnace chamber, and that a fluid flow which interfuses the pores of the material layer is applied to the material layer via a fluid line, which opens into the space, for generating vibrations in the material layer.

A nitrogen flow is preferably applied to the material layer. More preferably, the fluid flow is heated.

If the flow for forming a time-dependent application profile is applied using an alternating pressure, the application profile and the frequency of the vibrations of the material layer can be coordinated with each other in such a way that particularly large resonance amplitudes of the vibrations of the material layer are caused.

A particularly good coordination of the application profile and the vibration behavior of the material layer with each other in order to generate resonance vibrations becomes possible if the material layer is coordinated with the application profile within the design of the material layer and/or the elasticity of the material layer.

Hereinafter, a preferred embodiment of the radar antenna device will be explained in more detail with the aid of the drawing.

BRIEF DESCRIPTION OF THE DRAWING FIGURES

FIG. 3 shows an enlarged partial illustration of the material layer according to view X in FIG. 2 without the flow being applied;

FIG. 4 shows the material layer illustrated in FIG. 3 with the flow being applied.

DETAILED DESCRIPTION OF THE INVENTION

Figure 1:
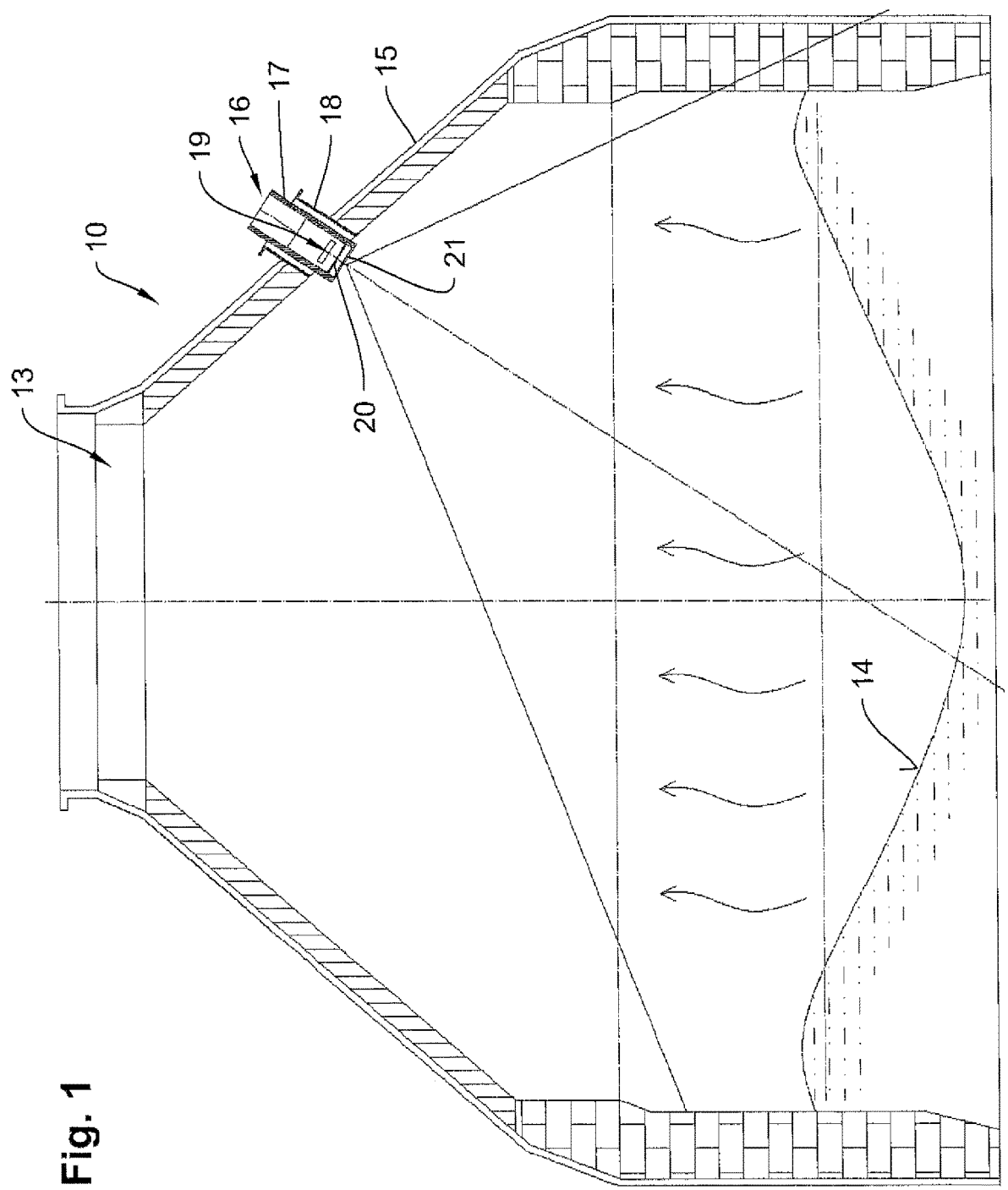
FIG. 1 shows a radar device disposed in a furnace chamber of a shaft furnace.

FIG. 1 shows an upper furnace 10 of a shaft furnace having a furnace opening 13 via which the shaft furnace is charged with layers of coke and burden not illustrated in more detail in FIG. 1, said furnace opening 13 being closeable by means of a lid not illustrated in more detail here. A burden surface 14 is formed within a furnace bottom 12, an atmosphere containing hot gases ascending towards the furnace opening 13 being formed above said burden surface 14. Owing to the charging of the furnace, the atmosphere is heavily coated with dust.

Figure 2:
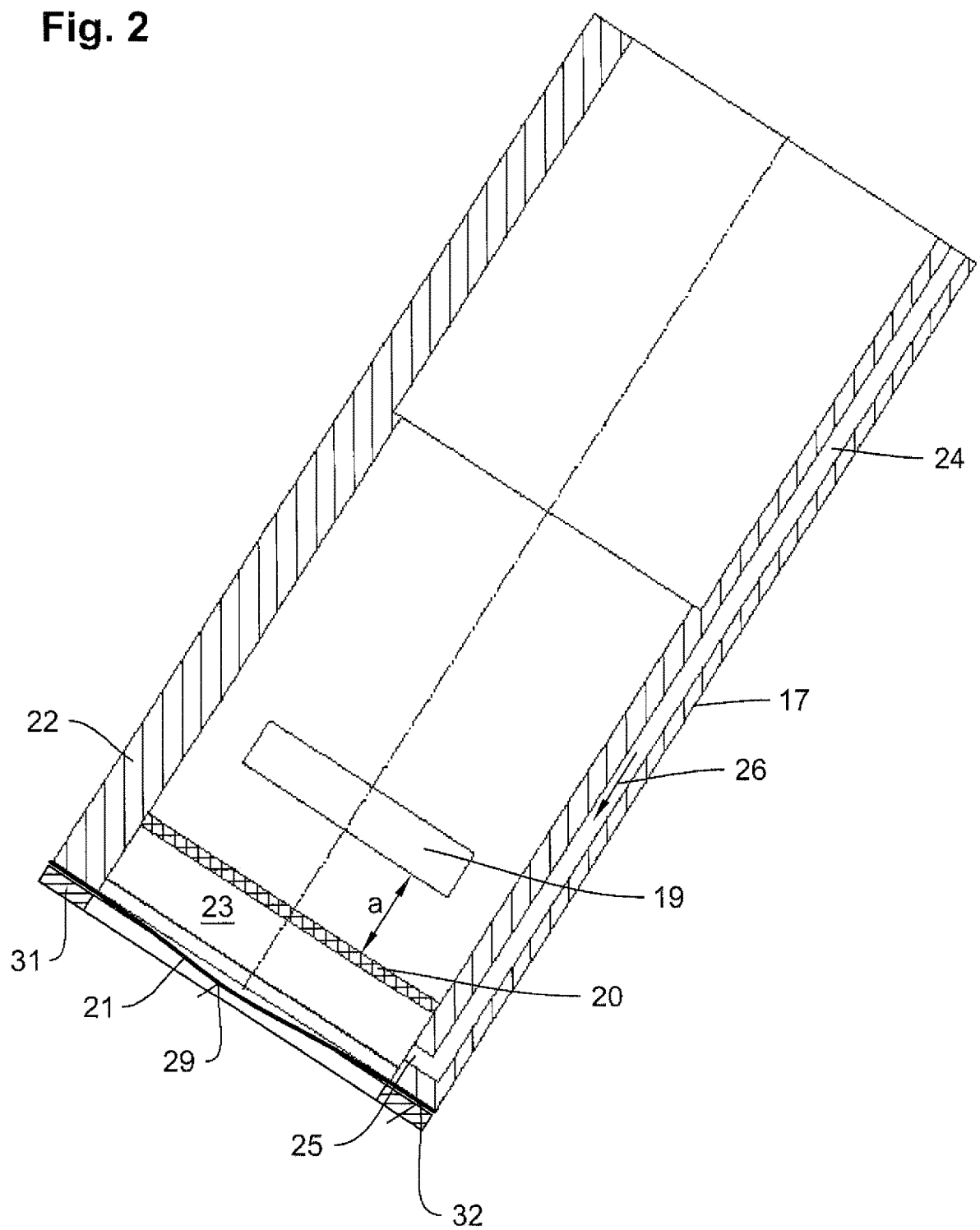
FIG. 2 shows an enlarged sectional illustration of the radar device illustrated in FIG. 1 having a material layer which is disposed upstream of a protective plate.

To map a burden surface 14 illustrated in FIG. 1, a radar antenna device 16 is arranged in a furnace wall 15 of the upper furnace 10, said radar antenna device 16 having an antenna arrangement 19 arranged in a housing 17 which is arranged in a housing receptacle 18 penetrating the furnace wall 15. Towards the furnace atmosphere, the antenna arrangement 19 is covered with a radar-transparent protective plate 20, which in this instance forms a frontal housing wall. As shown in FIG. 2, the housing 17 comprises a shielding device which is disposed at a distance a towards the furnace atmosphere, is realized as a limp material layer 21 and is connected at its periphery to a housing wall 22 in such a way that between the material layer 21 and the protective plate 20 a space 23 which is limited in all directions is formed.

The limp material layer 21 is realized as a cloth in the case at hand, the material layer 21 being attached to a front edge 32 of the housing 17 via a flange ring 31.

As FIG. 2 further shows, the housing wall 22 comprises a fluid line 24, which, in the case at hand, is realized as a bore extending in the longitudinal direction of the housing 17 within the housing wall 22 opens into the space 23 via an outlet opening 25. The fluid line 24 enables introducing a fluid flow 26, which is realized as a nitrogen flow in the case at hand, from outside the shaft furnace 10 to the space 23.

A fluid supply line not illustrated in more detail in the case at hand is preferably provided in an area outside the shaft furnace, said fluid supply line having a valve device which allows setting a defined fluid flow 26, the pressure and the volume flow of the fluid flow 26 as well as a defined time-dependent pressure gradient of the fluid flow 26 preferably being able to be predetermined. Applying pressure changing in a time-dependent manner to the material layer 21 can take place by means of the valve device, so for example applying pressure impulses at a defined level at one-second intervals. A pulsating widening of the flow cross section of pores 30 (FIGS. 3 and 4) of the material layer 21 takes places depending on the pressure impulses, whereby the material layer 21 starts to vibrate. The vibrations can be superimposed at the housing 17 having a flutter of the material layer 21 in particular in a limp arrangement of the material layer 21, meaning a material layer 21 with a slack. It is also possible to arrange a material layer 21 on the housing 17 with pretension, said material layer 21 comprising a sufficient elasticity for realizing a vibration amplitude.

FIGS. 3 and 4 show an enlarged view of the material layer 21, which in the case at hand has a fabric structure 33 having longitudinal threads 27 and transverse threads 28 crisscrossing each other, said transverse threads 28 limiting the pores 30 and therefore defining the flow cross section of the pores 30. In the case at hand, the longitudinal threads 27 as well as the transverse threads 28 have an elastic sheath. The longitudinal threads 27 and the transverse threads 28 can, for example, be made from glass fiber, which are covered by Teflon for forming the sheath.

FIG. 3 shows the material layer 21 without the application of pressure. FIG. 4 shows the material layer 21 having widened pores 30 owing to the application of pressure. Compared to this, the pores 30 are correspondingly smaller if the pressure drops so that in the case of an elastic material layer 21, not only the material layer 21 as such shows a vibration amplitude but the pores 30 of the material layer also vibrate or pulsate.

A layer containing dust deposited on the front face 29 (FIG. 2) of the material layer 21 facing the oven atmosphere is therefore shaken off by means of the vibrations of the material layer 21. At the same time, the material layer 21 prevents a coating layer from forming on the protective plate 20.

The invention claimed is:

1. A radar antenna device (16) having an antenna arrangement (19) that is accommodated in a housing (17) and is provided with a protective plate (20) for being separated with respect to a furnace atmosphere formed within a furnace chamber, said protective plate (20) being disposed on the housing, characterized in that a radar-transparent limp material layer (21) comprising pores (30) is disposed as a shield at a distance upstream of the protective plate (20) in such a manner that a space (23) which is separated by the material layer (21) is formed with respect to the furnace chamber, a fluid line (24) opening into said space (23) for applying a fluid flow (26) to the material layer (21), wherein the radar-transparent material layer (21) has a fabric structure (33).

2. The radar antenna device according to claim 1, characterized in that the material layer (21) is formed in an elastic manner.

3. The radar antenna device according to claim 1, characterized in that the fabric structure (33) has at least partially elastic longitudinal threads (27) or transverse threads (28).

4. The radar antenna device according to claim 3, characterized in that the longitudinal threads (27) or transverse threads (28) have an elastic sheath (29).

5. The radar antenna device according to claim 3, characterized in that the longitudinal threads (27) or transverse threads (28) are impregnated with an elastic material.

6. The radar antenna device according to claim 1, characterized in that the fluid line (24) is at least partially formed within a housing wall (22) of the housing (17).

7. The radar antenna device according to claim 1, characterized in that the fluid line (24) is provided with a heating device at least in sections.

8. A method for shielding a radar antenna device (16) which emits radar radiation and comprises an antenna arrangement (19) disposed in a housing (17), said antenna arrangement (19) being provided with a protective plate (20) for being separated with respect to a furnace atmosphere formed within a furnace chamber and said protective plate being disposed on the housing, characterized in that a radar-transparent limp material layer (21) comprising pores (30) is disposed upstream of the protective plate (20) for shielding from the furnace atmosphere, in such a manner that a space (23) is formed between the protective plate (20) and the material layer (21), said space (23) being separated from the furnace chamber, and that a fluid flow (26) which interfuses the pores (30) of the material layer is applied to the material layer (21) via a fluid line (24) which conducts to the space (23) for generating vibrations in the material layer (21), wherein the radar-transparent limp material layer (21) has a fabric structure (33).

9. The method according to claim 8, characterized in that the fluid flow (26) is heated.

10. The method according to claim 8, characterized in that the fluid flow (26) is formed as a nitrogen flow.

11. The method according to claim 8, characterized in that the flow for forming a time-dependent application profile is applied using an alternating pressure.

12. The method according to claim 8, characterized in that the material layer (21) is coordinated with the application profile within the design of the material layer (21) and/or the elasticity of the material layer (21) in order to generate vibrations of the material layer.

\* \* \* \* \*